(12) United States Patent
Ung et al.

(10) Patent No.: US 8,521,448 B1
(45) Date of Patent: Aug. 27, 2013

(54) STRUCTURAL ANALYSIS USING MEASUREMENT OF FASTENER PARAMETERS

(75) Inventors: Kevin Y. Ung, Bellevue, WA (US); Arun Ayyagari, Seattle, WA (US); Craig F. Battles, Seattle, WA (US); James T. Farricker, North Bend, WA (US); Brian Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 12/582,885

(22) Filed: Oct. 21, 2009

(51) Int. Cl.
*G06F 19/00* (2011.01)

(52) U.S. Cl.
USPC .......................................................... 702/42

(58) Field of Classification Search
USPC .......................................... 702/42, 182–185
See application file for complete search history.

(56) References Cited

U.S. PATENT DOCUMENTS

| | | | |
|---|---|---|---|
| 4,114,428 A | 9/1978 | Popenoe | |
| RE30,183 E | 1/1980 | Popenoe | |
| 4,294,122 A * | 10/1981 | Couchman | 73/761 |
| 4,333,351 A | 6/1982 | Bickford | |
| 4,344,216 A | 8/1982 | Finkelston | |
| 4,375,121 A | 3/1983 | Sigmund | |
| 4,602,511 A | 7/1986 | Holt | |
| 4,791,838 A | 12/1988 | Bickford et al. | |
| 4,846,001 A | 7/1989 | Kibblewhite | |
| 4,899,591 A | 2/1990 | Kibblewhite | |
| 5,018,988 A | 5/1991 | Kibblewhite | |
| 5,029,480 A | 7/1991 | Kibblewhite | |
| 5,112,248 A | 5/1992 | Kibblewhite et al. | |
| 5,131,276 A | 7/1992 | Kibblewhite | |
| 5,205,176 A | 4/1993 | Kibblewhite | |
| 5,216,622 A | 6/1993 | Kibblewhite et al. | |
| 5,220,839 A | 6/1993 | Kibblewhite | |
| 5,412,582 A * | 5/1995 | Hesthamar et al. | 702/43 |
| 5,437,525 A | 8/1995 | Bras | |
| 5,884,232 A * | 3/1999 | Buder | 702/42 |
| 6,009,380 A | 12/1999 | Vecchio et al. | |
| 6,009,759 A | 1/2000 | Kibblewhite et al. | |
| 6,263,268 B1 | 7/2001 | Nathanson | |
| 6,327,921 B1 | 12/2001 | Hsu | |
| 6,354,152 B1 | 3/2002 | Herlik | |
| 6,358,051 B2 | 3/2002 | Lang et al. | |

(Continued)

FOREIGN PATENT DOCUMENTS

DE 19746272 A1 4/1999
DE 19917222 A1 11/2000

(Continued)

OTHER PUBLICATIONS

"Load Control Technologies I-Bolt®": http://www.innovationplus.com/tech.php.

(Continued)

*Primary Examiner* — Edward Raymond
(74) *Attorney, Agent, or Firm* — Parsons Behle & Latimer

(57) ABSTRACT

A computer implemented method is provided for analyzing the health of a structure by measuring the value of preload on each of a plurality of fasteners installed on the structure and correlating the measured values of preload with a set of specifications. A report is generated for each of the fasteners representing the results of the correlations. Groups of the fastener reports are used to infer the health of the structure.

20 Claims, 12 Drawing Sheets

(56) References Cited

U.S. PATENT DOCUMENTS

| | | | |
|---|---|---|---|
| 6,501,211 B1 | 12/2002 | Nasrollahzadeh | |
| 6,691,007 B2 | 2/2004 | Haugse | |
| 6,843,628 B1 | 1/2005 | Hoffmeister | |
| 6,965,835 B2 | 11/2005 | McGee et al. | |
| 6,988,026 B2 | 1/2006 | Breed | |
| 6,990,866 B2 | 1/2006 | Kibblewhite | |
| 7,136,785 B2 * | 11/2006 | Mast et al. | 703/1 |
| 7,180,404 B2 | 2/2007 | Kunerth | |
| 7,246,980 B2 | 7/2007 | Azzalin | |
| 7,369,966 B1 | 5/2008 | Scelsi et al. | |
| 7,412,808 B2 | 8/2008 | Lavi | |
| 7,412,898 B1 * | 8/2008 | Smith et al. | 73/761 |
| 7,441,462 B2 | 10/2008 | Kibblewhite | |
| 7,559,135 B2 | 7/2009 | Rode | |
| 7,680,565 B2 | 3/2010 | Balasu et al. | |
| 7,703,669 B2 | 4/2010 | Amirehteshami et al. | |
| 7,983,854 B2 * | 7/2011 | O'Brien | 702/42 |
| 2002/0162889 A1 | 11/2002 | Navon | |
| 2003/0030564 A1 | 2/2003 | Boyce et al. | |
| 2003/0158676 A1 * | 8/2003 | Fields et al. | 702/42 |
| 2003/0205187 A1 | 11/2003 | Carlson et al. | |
| 2004/0065154 A1 | 4/2004 | Kibblewhite | |
| 2004/0067120 A1 | 4/2004 | Speer | |
| 2006/0009924 A1 | 1/2006 | McGee et al. | |
| 2006/0025897 A1 | 2/2006 | Shostak | |
| 2006/0109118 A1 | 5/2006 | Pelo et al. | |
| 2006/0130590 A1 | 6/2006 | Kibblewhite | |
| 2006/0214789 A1 | 9/2006 | Posamentier et al. | |
| 2006/0243056 A1 * | 11/2006 | Sundermeyer et al. | 73/760 |
| 2006/0285441 A1 | 12/2006 | Walker et al. | |
| 2008/0011091 A1 * | 1/2008 | Weldon | 73/766 |
| 2008/0061145 A1 | 3/2008 | McGushion | |
| 2008/0061984 A1 | 3/2008 | Breed | |
| 2008/0115589 A1 | 5/2008 | DeRose et al. | |
| 2008/0115636 A1 | 5/2008 | DeRose | |
| 2008/0178713 A1 | 7/2008 | Long | |
| 2009/0038401 A1 | 2/2009 | Kibblewhite | |
| 2009/0038402 A1 | 2/2009 | Kibblewhite | |
| 2009/0071078 A1 * | 3/2009 | Rakow et al. | 52/1 |
| 2009/0112925 A1 | 4/2009 | Amirehtesh et al. | |
| 2009/0128169 A1 | 5/2009 | Fay | |
| 2009/0157358 A1 * | 6/2009 | Kim | 702/185 |
| 2009/0218891 A1 | 9/2009 | McCollough, Jr. | |
| 2009/0249878 A1 | 10/2009 | Faber et al. | |
| 2010/0050778 A1 * | 3/2010 | Herley et al. | 73/761 |
| 2010/0100338 A1 * | 4/2010 | Vik et al. | 702/42 |
| 2010/0116887 A1 | 5/2010 | Barkan et al. | |

FOREIGN PATENT DOCUMENTS

| | | |
|---|---|---|
| EP | 1188521 A2 | 3/2002 |
| WO | WO2007034197 A1 | 3/2007 |
| WO | WO2011028362 A1 | 3/2011 |

OTHER PUBLICATIONS

International Search Report for PCT/US2010/056888 dated Feb. 10, 2011.
Office Action for U.S. Appl. No. 12/852,855 dated Aug. 2, 2012.
European Patent Office, Examination report for EP Application No. 08253538.6 dated Aug. 3, 2012.
US Patent and Trademark Office, Final Office Action for U.S. Appl. No. 12/691,796 dated Jan. 11, 2013.
US Patent and Trademark Office; Office Action for U.S. Appl. No. 12/552,895 dated Mar. 25, 2011.
US Patent and Trademark Office; Office Action for U.S. Appl. No. 12/552,895 dated Oct. 5, 2011.
US Patent and Trademark Office; Office Action for U.S. Appl. No. 12/536,438 dated Nov. 8, 2011.
US Patent and Trademark Office; Final Office Action for U.S. Appl. No. 12/536,438 dated Feb. 22, 2012.
US Patent and Trademark Office; Office Action for U.S. Appl. No. 12/852,855 dated Feb. 25, 2013.
US Patent and Trademark Office, Office Action for U.S. Appl. No. 12/691,796 dated Jul. 19, 2012.
US Patent and Trademark Office, Office Action Dated Oct. 4, 2012 for U.S. Appl. No. 12/536,438.

* cited by examiner

STRUCTURAL ANALYSIS USING MEASUREMENT OF FASTENER PARAMETERS

CROSS REFERENCE TO RELATED APPLICATIONS

This application is related to U.S. patent application Ser. Nos. 12/536,438, filed Aug. 5, 2009; 12/582,855 filed concurrently herewith on Oct. 21, 2009; 11/931,628 filed Oct. 31, 2007; 61/190,986, filed Sep. 4, 2008; and 12/552,895 filed Sep. 2, 2009, all of which applications are incorporated by reference herein in their entireties.

TECHNICAL FIELD

This disclosure generally relates to structural analyses, and deals more particularly with a system for analyzing structures such as aircraft by measuring parameters of fasteners installed on the structure.

BACKGROUND

It is sometimes necessary to periodically monitor certain features of a structure in order to evaluate its strength and integrity. In those structures where fasteners are used, certain parameters of the fasteners, such as clamping force, may be periodically measured in order to determine whether they fall outside of tolerances that could affect the strength or integrity of the structure. For example, in the case of vehicles such as aircraft, the clamping force applied by fasteners in certain mission critical structural joints and assemblies must be maintained within prescribed limits. Periodic monitoring of fastener clamping force in aircraft may be necessary because of the tendency of some structures to relax overtime, and undergo physical changes due to work hardening and creep, all of which may result in a change in the preload of the fasteners. Where a fastener preload is found to be outside of the prescribed limits, it may be necessary to re-torque the fastener, or replace it.

In the past, limited use was made of fastener measurements, rather these measurements were largely used only to confirm that the fastener was either within or outside of prescribed engineering tolerances. It was assumed that by either re-torquing the fastener to original specifications or replacing it, the structure was returned to near its original manufactured state. In fact, however, fastener status may change materially between physical inspections and these changes may have a material impact on the health of a structure.

Accordingly, there is a need for a structural analysis system that employs a computer implemented method for assessing the health of the structure using non-contact measurement of fastener parameters. There is also a need for a structural analysis method using that may be used to establish the basis for maintenance and process/material/component improvements.

SUMMARY

In accordance with the disclosed embodiments, a method and system are provided for performing structural analysis based on non-contact measurement of one or more parameters of fasteners installed on the structure. The measured parameter values for a group of the bolts may be correlated with a set of engineering or other characteristics. The results of the correlation may be accumulated in the form of analytical reports for each of the fasteners. The analytical reports are used to infer information useful in analyzing the health of the structure. The disclosed method uses non-contact, wireless techniques for gathering the measured fastener parameters, thereby reducing labor. Correlation of fastener measurements and generation of inferencing information related to structural health may be performed using a programmed computer.

According to one disclosed embodiment, a method is provided of analyzing a structure, comprising measuring the value of at least one parameter indicating the status of each of a plurality of fasteners installed on a structure. The measured values are correlated and the structure is analyzed based on the results of the correlation. The steps of correlating the measured parameters and analyzing the structure may be performed using a programmed computer. The correlation may include correlating the measured values to predefine characteristics of the environment in which the fastener is installed. The method may further comprise generating an analytical report for each of the fasteners based on the results of the correlation. Analyzing the structure may include using a computer to infer the health of a structure based on the results of the correlations.

According to another embodiment, a computer implemented method is provided of analyzing the health of a structure. The method comprises measuring the value of preload of each of a plurality of fasteners installed on the structure, and correlating the measured values of the preload with a set of specifications. The method further includes generating a report for each of the fasteners representing the results of the correlations, and using groups of the fastener reports to infer the health of the structure.

According to still a further embodiment, a system is provided for analyzing an aircraft structure having a plurality of fasteners installed thereon. The system includes a plurality of sensors respectively on the fasteners which are each operable for measuring the value of at least one parameter related to the associated fastener. The system includes a database containing information related to characteristics of the structure. At least one correlation and analysis module is provided for correlating the measured values of the parameter with at least one of the characteristics contained in the database, and for generating a report reflecting the results of the correlation. An information inferencing engine is used to infer structural information based on the report and to generate a structural analysis report reflecting the inferred structural information.

The disclosed embodiments satisfy the need for a method and system of analyzing the health of a structure, using wireless, non-contact techniques for measuring parameters installed in the structure which may be implemented by computer to provide rapid, consistent results.

BRIEF DESCRIPTION OF THE ILLUSTRATIONS

DETAILED DESCRIPTION

Figure 1:
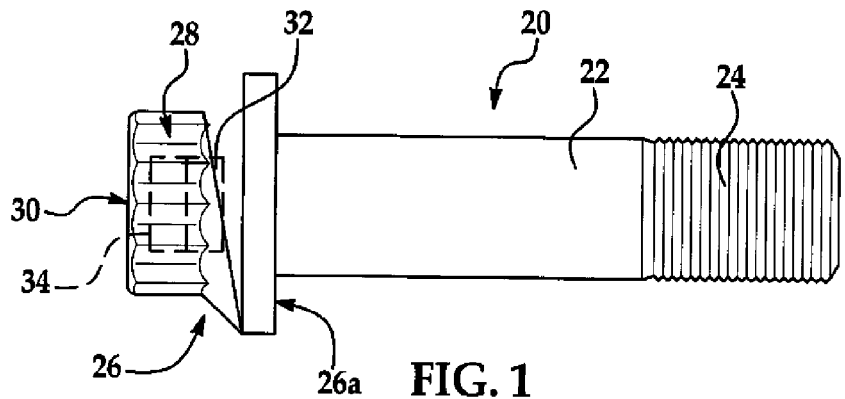
FIG. 1 is a side view illustrating a fastener having a sensor and an RFID tag.
Figure 2:
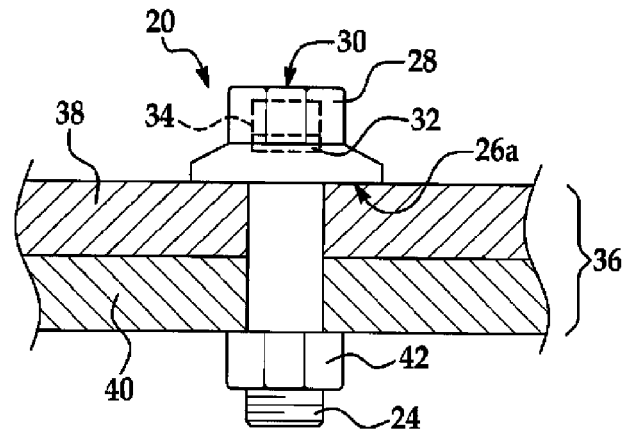
FIG. 2 is a cross sectional illustration of a structural joint clamped by a fastener of the type shown in FIG. 1.
Figure 3:
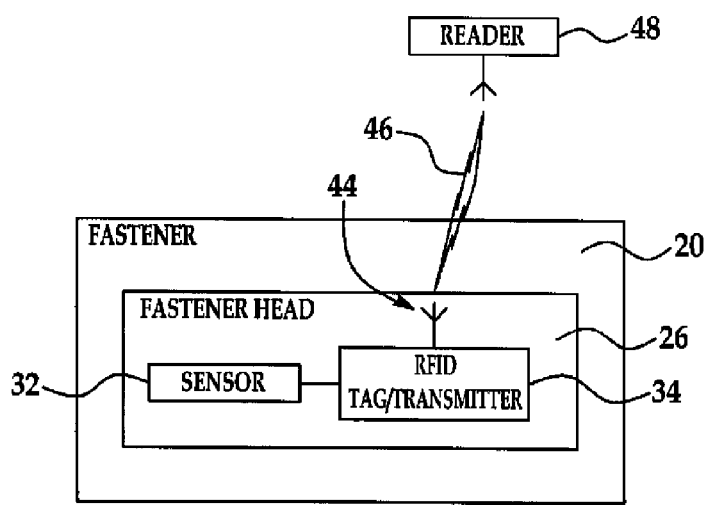
FIG. 3 is a block diagram illustration of the fastener shown in FIGS. 1 and 2, including a wireless communication link between the fastener and a reader.

Referring to FIGS. 1-3, the disclosed embodiments broadly relate to a system for monitoring the status of one or more fasteners 20 installed on a structure 36 (FIG. 2) and using this fastener status to determine the health of the fastener and/or the structure 36. In the illustrated embodiment, the structure 36 is shown as comprising a pair of structural plates 38, 40, however the disclosed embodiments may be employed to monitor the health of a wide range of structural components, parts and assemblies held or clamped by one or more fasteners 20. The fastener 20 may comprise any of a wide range of hardware devices that may be used to mechanically join, affix or clamp two or more members together. For example, the fastener 22 may comprise, without limitation, a bolt, screw, stud, clamp or pin, to name only a few. For convenience in the present description, the illustrated fastener 20 comprises a bolt that includes a shank 22 having an external threaded end 24 and a head 26. The head 26 may include wrench flats 28 adapted to be engaged by a suitable wrench or other tool (not shown) used to install and/or tighten/loosen the fastener 20. As shown in FIG. 2, the head 26 may include a shoulder 26a for engaging a face of one of the structural members 38, while a nut 42 on the threaded end 24 is used to engage a face of the other structural member 40, thereby clamping the structure 36 between the head 26 and the nut 42. Torque applied to the nut 42 or to the head 26 clamps the plates 38, 40 together with a clamping force during an installation process.

In accordance with the disclosed embodiments, a sensor 32 is mounted within a recess 30 in the head 26, generally in axial alignment with the longitudinal axis of the shank 22. The sensor 32 may be held on the head 26 by any suitable means, such as an adhesive. It should be noted here that the sensor 32 may instead be mounted an the threaded end 24 of the fastener 20, or on the fastener head 26 either with or without a recess 30.

The sensor 32 may comprise any of a variety of transducers using any of various technologies suitable for measuring the value of one or more parameters of interest that represent or are related to the status of the fastener 20, or to the structure 36, such as the tension in the fastener 20 resulting from the clamping force applied to the structure 36, also sometimes referred to herein as the "preload" of the fastener 20.

One suitable known type of sensor 32 uses ultrasonic techniques to measure a "time-of-flight" that is directly related to the tension or preload of the fastener 20. A voltage pulse applied to the sensor 32 propagates through the shank 22 as an ultrasonic wave that is reflected off of the end of the fastener 20 and travels back along the shank 22 as a reflected wave. The reflected wave is returned as an echo that is recorded by the sensor 32, and which has a time of flight that is directly proportional to the preload of the fastener 20. Evaluating a change in the time-of-flight relative to a zero load time of flight allows direct measurement of the preload of the fastener 20. During tightening, the fastener 20 elongates with load while the speed of the ultrasonic wave reduces with increasing fastener stress, resulting in an increase in the total time-of-flight that is directly proportional to load. As previously mentioned, while the sensor 32 may comprise an ultrasonic transducer, transducers using other technologies may be possible.

The tension on the fastener 20 is directly related to the amount of clamping force that clamps the structural plates 38, 40 together. Thus, the preload of the fastener may be related to qualities of the structure 36 of interest, such as, without limitation, its integrity and/or strength, which may also be referred to throughout the description as the "health" of the structure 36.

Although not shown in the drawings, a visual identifier, such as a serial number that uniquely identifies the fastener 20 may be placed anywhere on the fastener 20, such as on the head 26. For example, the identifier may comprise a visual pattern or indicia such as a barcode (not shown). As will be discussed below, the fastener 20 may also be uniquely identified by an electronic form of identifier, which may comprise digital information representing a numeric value forming part of an RFID (Radio Frequency Identification) tag 34. The RFID tag is mounted on the head 26 within the recess 30 and is operatively coupled with the sensor 32, as shown in FIG. 3. The RFID tag 34 may be read or "interrogated" by a suitable reader 48 using a wireless communication link 46 which will be discussed below in more detail. While an RFID tag 34 has been illustrated for ease of description, any of various other RF communication devices may be employed to store and communicate the measured fastener status to the reader 48.

The RFID tag 34 is operable for storing one or more parameters measured by the sensor 32 and for transmitting the stored values to the reader 48 using an antenna 44 which may form an integral part of the RFID tag 34. The RFID tag 34 may be either an active or a passive type. Active RFID tags may be powered by an internal battery (not shown) and may include both read and write modes, i.e. tag data can be rewritten and/or modified. Passive RFID tags may operate without an internal power source and may obtain power that is generated by the reader 48. Passive RFID tags may have shorter read ranges than active tags and may require a higher power reader. RFID tags 34 are advantageous in that they utilize non-contact, non-line of sight wireless technology to read and write data. The reader 48 may comprise a hand-held, portable unit, or may comprise a fixed unit that is located locally within the transmission range of the RFID tag 34. Where passive RFID tags 34 are used in the disclosed embodiments, they may be powered by power provided by the reader 48, or by nearby energy harvesting devices (not shown). As will be discussed later, a single reader 48 may be used to read the RFID tags 34 on multiple fasteners 20. When there is overlap in reader coverage, i.e. when a particular fastener is with communication range of more than one of the readers 48, then any of those readers 48 may interrogate the fastener 20. Each of the RFID tags 34 may include a unique identifier such as a serial number related to the particular fastener 20 which is transmitted along with the measured value of the parameter and uniquely identifies the associated fastener 20.

Figure 4:
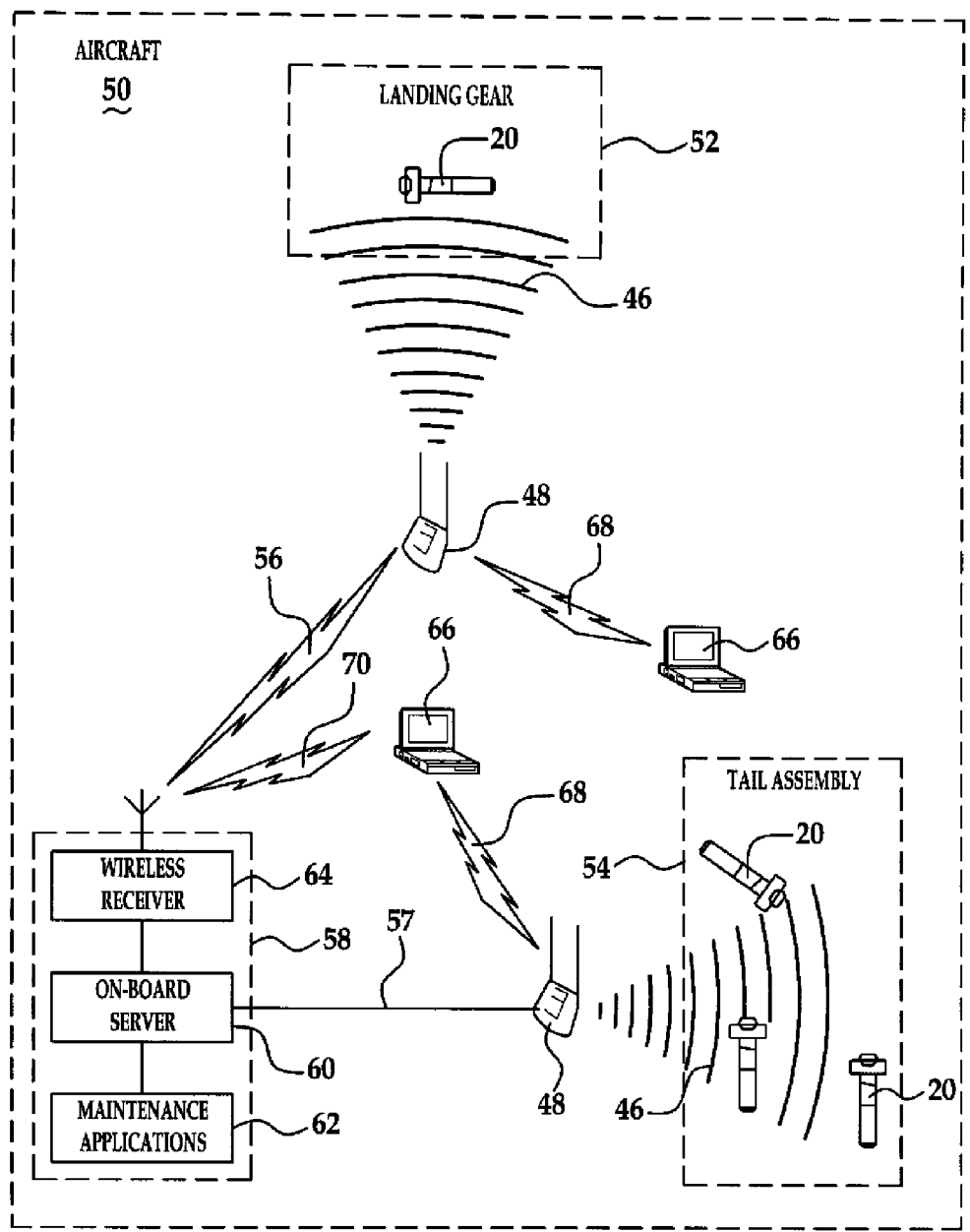
FIG. 4 is a combined block and diagrammatic illustration of a system for collecting fastener status in differing areas on an aircraft.

The system for monitoring fastener status, and particularly the values of fastener parameters of interest, may be advantageously used in a variety of industries and applications, including throughout the transportation industry, and for structural applications such as, without limitation, bridges, nuclear reactors, oil rigs, spacecraft, ships and petro-chemical plants, to name only a few. FIG. 4 illustrates the use of the disclosed embodiments in the context of maintaining and servicing an aircraft 50. The aircraft 50 may employ a plurality of the fasteners 20 in different regions or areas of the aircraft 50. For example, a set of the fasteners 20 may be used in an aircraft structure such as a landing gear 52, while another set of the fasteners 20 may be used in another aircraft structure or subsystem, such as a tail assembly 54. The status of the fasteners, i.e. the measured values of parameters of interest, is collected through wireless communication links 46 that allow readers 48 to interrogate the RFID tags 34 on each of the fasteners 20 within the reader's communication range. The parameters of interest measured by the sensors 32 may include a variety of environmental conditions that may represent structural risk factors and/or act as data points useful in guiding maintenance technicians in when and/or how to service or replace components. These data points may also be archived and compared with data acquired by routine visual inspections.

The communication link 46 between the RFID tags 34 and the readers 48 may comprise a spread spectrum communication system, although it is possible in some applications to employ a fixed frequency system. Spread-spectrum telecommunications is a signal structuring technique that employs direct sequence, frequency hopping, or hybrid of these methods. The use of spread spectrum communications decreases the potential interference to other receivers, and with increased security. Any of several forms of spread spectrum communications may be employed, including, without limitation, frequency-hopping spread spectrum (FHSS), direct-sequence spread spectrum (DSSS), time-hopping spread spectrum (THSS), chirp spread spectrum (CSS) or a combination of these techniques. The readers 48 may be mounted in fixed positions in the aircraft 50, within the range of the particular structure 52, 54 whose fasteners 20 are to be monitored. Each of the tag readers 48 is communicatively coupled with an onboard data communications network 58 either by means of a wireless communication link 56, or by means of a hard wire link 56. Additionally, it is possible that mobile computers, such as laptop computers 66 may be employed to collect fastener status either directly from the readers 48, or from the onboard data network 58 via wireless links 68, 70.

The onboard data network 58 may comprise an onboard computer server 60 running one or more maintenance software applications 62 used in maintaining and servicing the aircraft 50. Although not shown in FIG. 4, the network 58 may include suitable data storage for storing a variety of maintenance data, including but not limited to fastener status. The network 58 may also includes a wireless receiver 64 for collecting the fastener status from the readers 48 via data links 56, 57.

Figure 5:
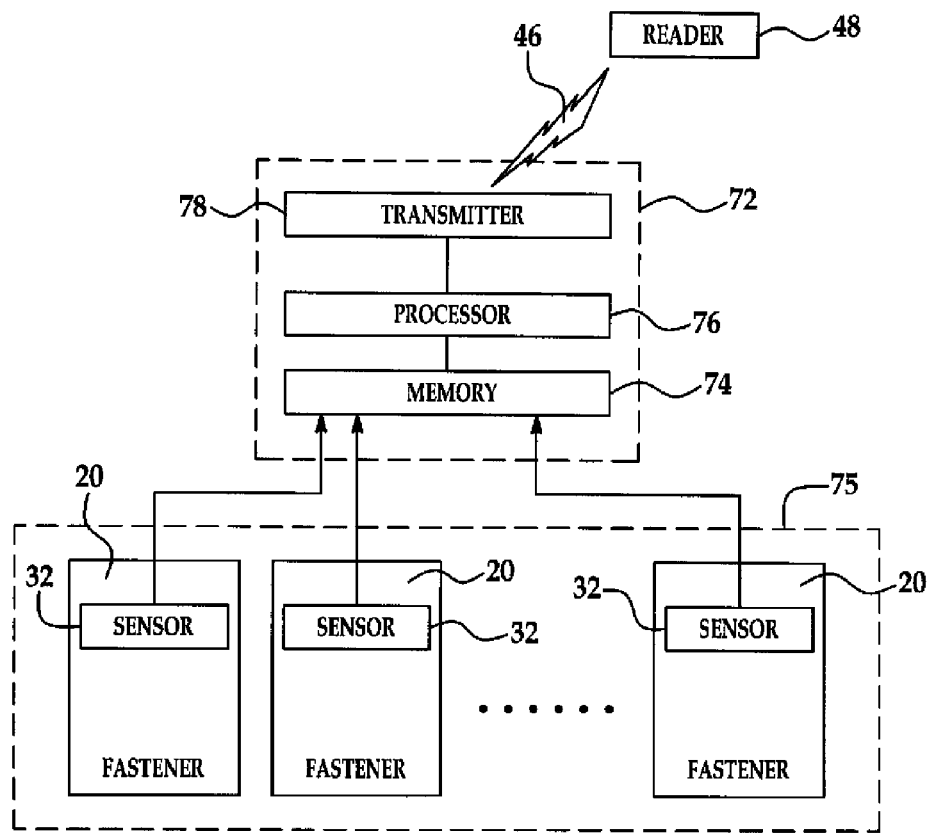
FIG. 5 is a block diagram illustration of an alternate arrangement for collecting measured parameter values from multiple sensors.

FIG. 5 illustrates an alternate embodiment in which a data storage module 72 is employed to locally collect and store fastener status data, i.e., measured parameter values from the sensors 32 on a plurality of the fasteners 20 located in a particular region or structure 75 of a vehicle, such as the aircraft 50. The fasteners 20 coupled with a common data storage module 72 may be functionally related. In this example, the data storage module 72 is hard wired to each of the fastener sensors 32. The data storage module 72 includes a memory 74 for storing the measured parameter values and a processor 76 for controlling the transfer of data into and from the memory 74. A transmitter 78 coupled with processor 76 may be used to transmit the measured parameter values stored in the memory 74 to a reader 48, either on an automatic, periodic basis or upon interrogation by the reader 48 via the wireless communication link 46.

Figure 6:
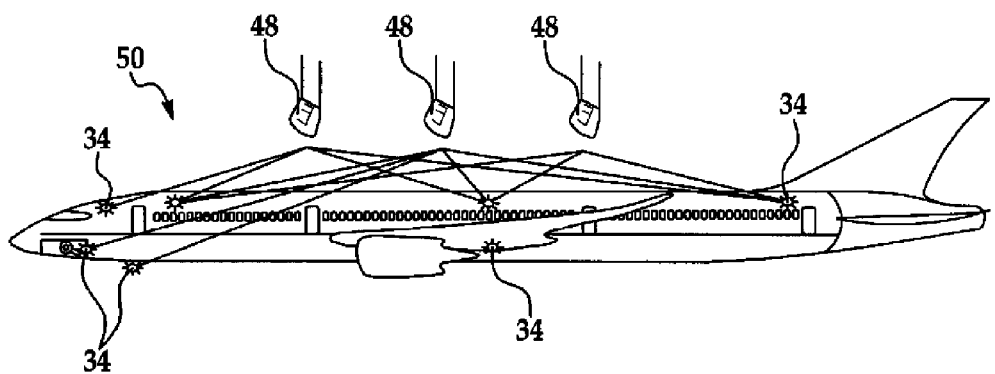
FIG. 6 is a side view of an aircraft, including an illustration of fasteners transmitting measured parameter values to more than one reader.

Attention is now directed to FIG. 6 which illustrates a plurality of RFID tags 34 representing the location of fasteners 20 (not shown in FIG. 6) which are distributed throughout the aircraft 50. In this example, three RFID tag readers 48 are employed at longitudinally spaced locations along the length of the aircraft 50, for reading all the tags 34. As can be seen in this example, and as discussed previously, it may be possible for a particular RFID tag 34 to be read or interrogated by two or more readers 48.

Figure 7:
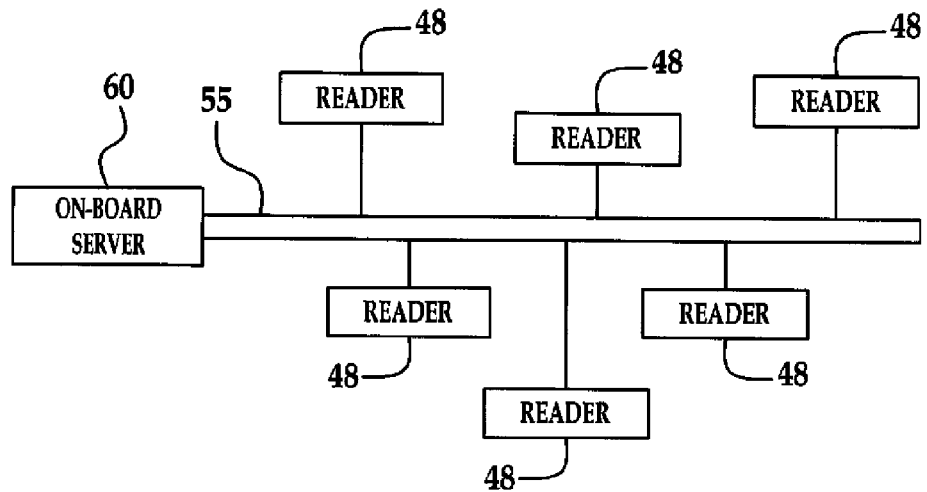
FIG. 7 is a block diagram illustrating multiple readers connected by a common bus to an onboard server on the aircraft shown in FIG. 6.

Referring to FIG. 7, in one embodiment, multiple tag readers 48 distributed along the length of the aircraft 50 shown in FIG. 6 may be coupled with the onboard server 60 via a common data bus 55. Data from the readers 48 may be delivered along the bus 55 using any of various well known multiplexing techniques.

Figure 8:
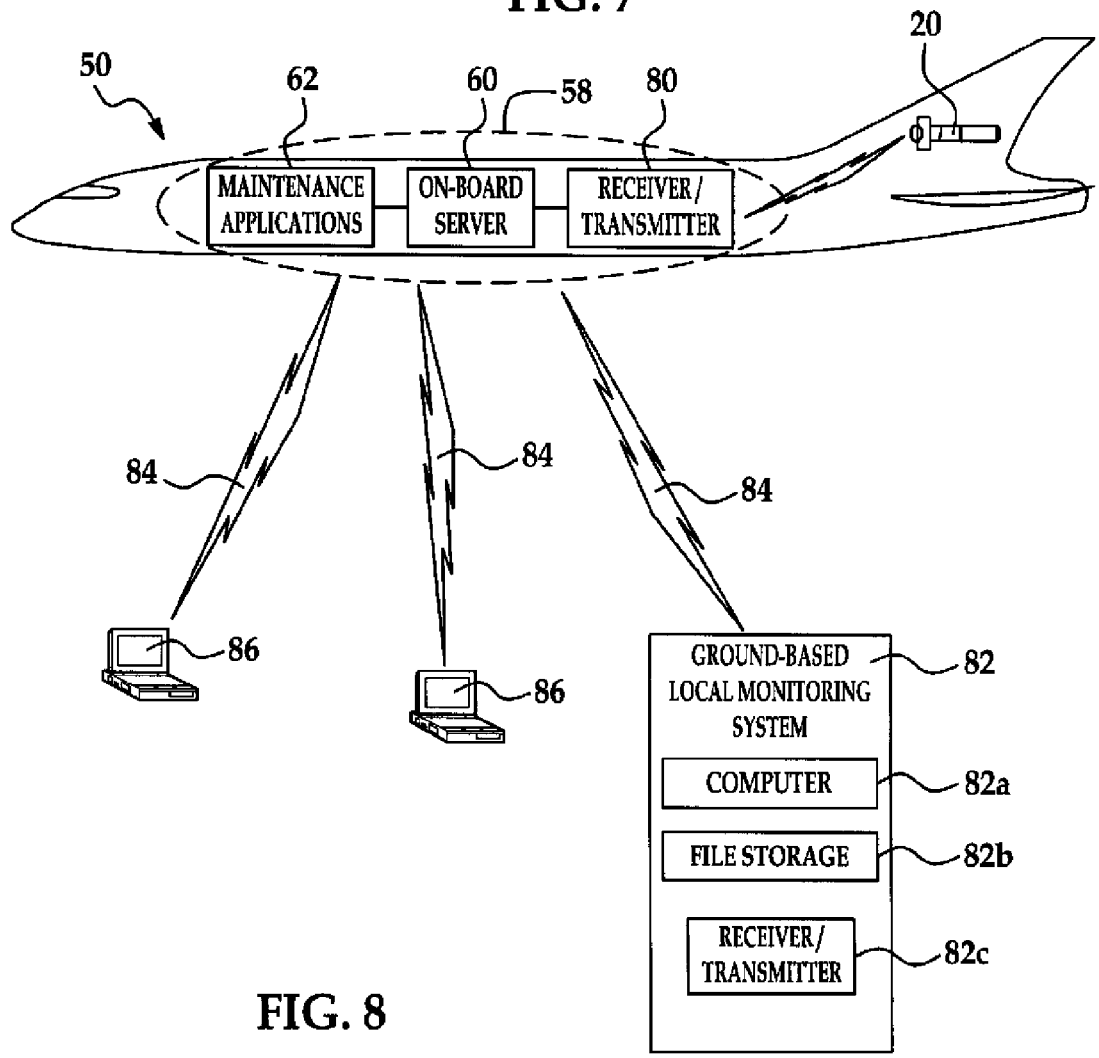
FIG. 8 is a combined block and diagrammatic illustration of a network onboard an aircraft wirelessly linked to a ground based monitoring station and mobile computers used to perform maintenance.

Attention is now directed to FIG. 8 which illustrates a system for transferring fastener status from the aircraft 50 to maintenance facilities or technicians on the ground. In this example, fastener status collected by the onboard server 60 forming part of the aircraft network 58 is wirelessly transmitted via a transmitter 80 to a ground based, local monitoring station 82 and/or to mobile computers 86 via wireless communication links 84 or hard wire links (not shown). The communication links 84 may comprise any of a variety of existing data links that are commonly used to transmit data from the aircraft 50 to the ground, including satellite links (Satcom) while the aircraft 50 is airborne, and other wireless communication systems such as Wimax, WiFi, cellular telephony, free space optics (FSO) based lasercom and others which link the aircraft 50 to ground service organizations after the aircraft 50 has landed, and/or has arrived at a gate. The local monitoring station 82 may comprise a wireless receiver/transmitter 82c for communicating with the network 50 onboard the aircraft 50, as well as a computer 82a and suitable file storage 82b for storing maintenance data, including the fastener status downloaded from the network 58.

Figure 9:
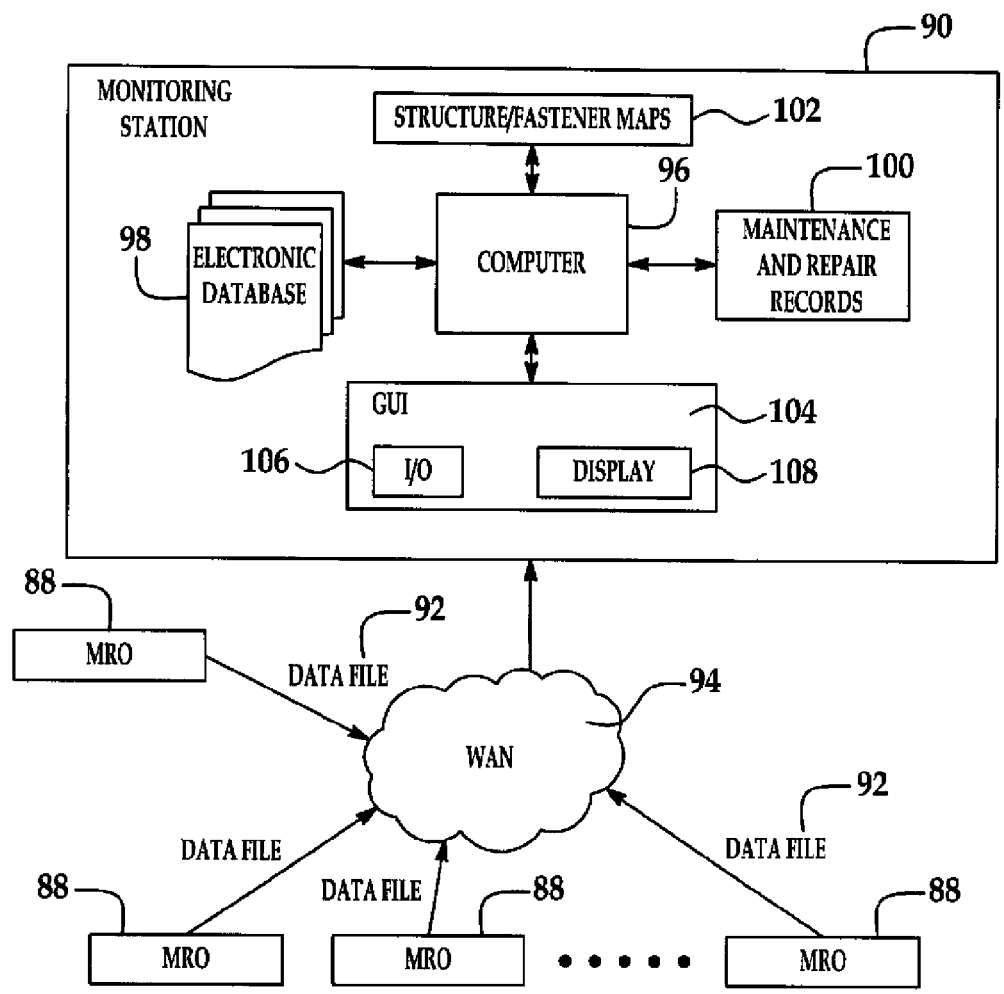
FIG. 9 is a block diagram illustration of a system for monitoring fastener status on multiple aircraft located at differing remote sites.

FIG. 9 illustrates the use of the disclosed embodiment in the context of maintaining and servicing a fleet of aircraft which may be located at various airports (not shown) where the aircraft are serviced or repaired by a local repair and maintenance organization (MRO) 88 at or nearby an airport.

Each of the MROs 88 may include the ground based local monitoring station 82 previously mentioned in connection with FIG. 8.

Each of the MROs 74 may use the fastener status data downloaded from the onboard networks 58 of aircraft 50 for use in servicing and maintaining the aircraft, as previously discussed. However, the MROs 48 may transfer the fastener status in the form of data files 92 via a wide area network 94, such as the Internet, to a remote or central monitoring station 90. The remote monitoring station 90 may include a computer 96 coupled with a graphical user interface (GUI) 104. The GUI 104 may include a suitable electronic display 108 and one or more input/output devices 106 to allow a user to communicate with the computer 96. The computer 96 may access various structural maps 102 and similar data files that may be used to graphically display sections of aircraft 50 where fasteners 20 may require monitoring. The computer 96 may also have access to various maintenance and repair records 100, including archival information relating to the health of various systems and structures on the aircraft 50 as well as reference values representing tolerance ranges for fastener parameters, such as preload.

The data files 92 collected by the remote monitoring station 90 from the MROs 88 may be stored in an electronic database 98 along with other information derived from the maps 102 and maintenance and repair records 100. It should noted here, that in the event that connectivity is lost between the aircraft 50 and the MRO 88 or other local ground-based monitoring station, the on-board network 58 may either store the fastener status data for future downloading or forwarding, or forward the fastener status data directly to the remote monitoring station 90.

Figure 10:
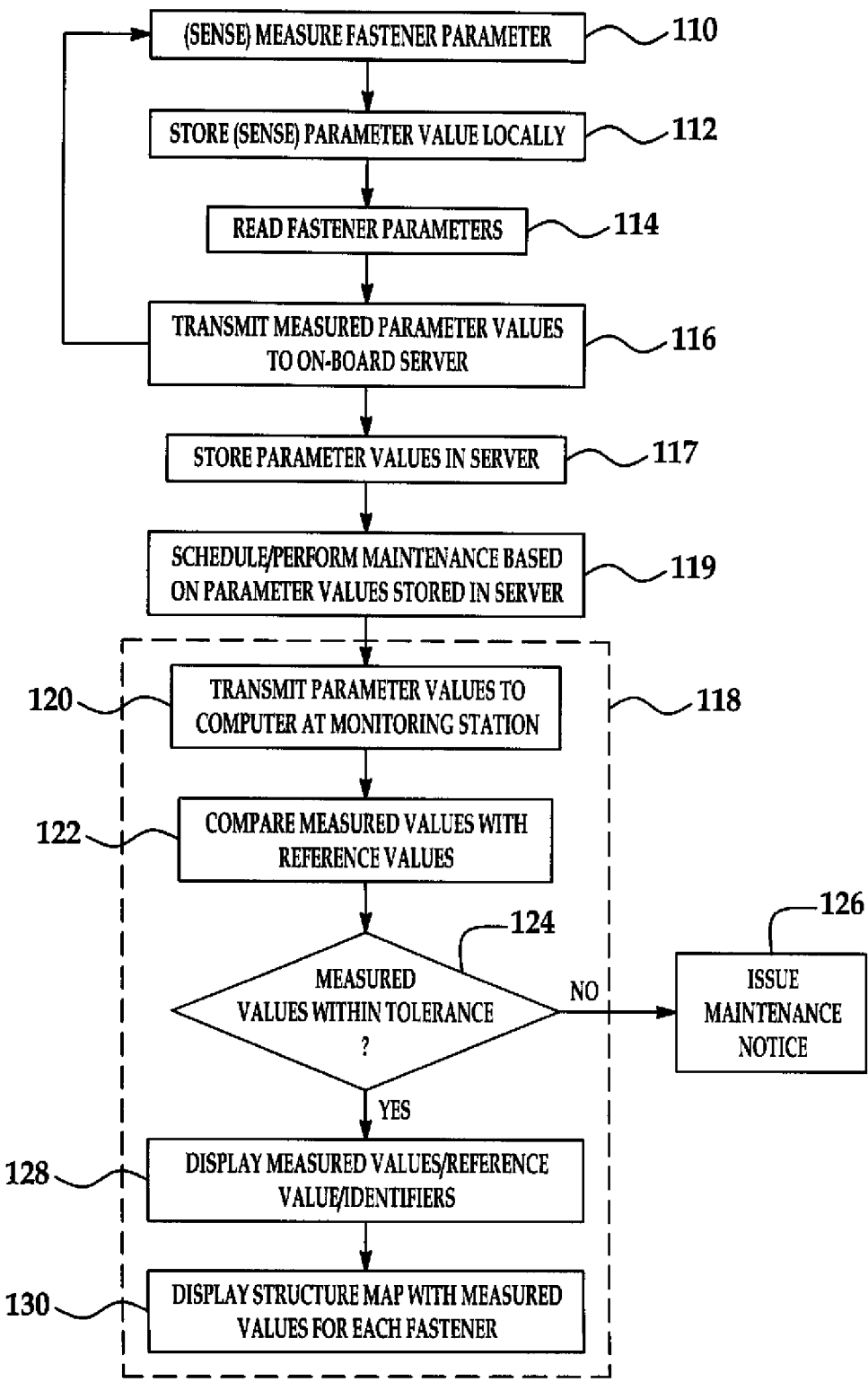
FIG. 10 is a flow diagram illustration showing the steps of a method of monitoring the status of fasteners and performing maintenance using the fastener status.

Attention is now directed to FIG. 10 which broadly illustrates the steps of a method for monitoring fastener status according to the disclosed embodiments. Beginning at 110, the sensors 32 on each fastener 20 measure the value of a parameter of interest, such as preload, and the measured value is locally stored at 112, either on the RFID tag 34 or in a local memory, such as memory 74 forming part of data storage module 72 shown in FIG. 5. At step 114, the measured values of the fastener parameters are read by the readers 48 and these values are then transmitted from the readers 48 to the onboard server 60 at step 116. Steps 110-116 are repeated for each of the fasteners 20 at desired intervals. During the interrogation of the RFID tags 34 by the readers 48, additional data such as the unique identifiers previously mentioned will be read along with the measured parameter values so that the onboard server 60 may associate the collected parameter values with the corresponding ID serial numbers of the fasteners 20. The parameter values are stored in the server 60 as shown at step 117 and may be used to schedule and/or perform maintenance on the aircraft 50 as shown at step 119.

Optionally, a series of additional steps 118 may be carried out to allow monitoring of fastener status at ground locations, and/or analysis of the preload values for purposes of assessing the health of certain structures on the aircraft 50. Beginning at step 120 the measured fastener parameter values may be transmitted to a computer 82a at a ground based monitoring system (see FIG. 8). At step 122, the measured values may be compared with reference values at the monitoring station 82.

As shown at 124, if the measured parameter values are not within tolerance, then an electronic notice may be automatically issued to maintenance personnel in the form of a maintenance request to service the fasteners 20 that are out of tolerance. At 128, the measured values and reference values, along with fastener identifiers (IDs) may be displayed on a suitable graphic user interface (not shown in FIG. 8), forming part of the monitoring system 82. Optionally, as shown at 130, a structural map (discussed later) may be displayed showing the location of the fasteners on the structure, along with the measured parameter values for each fastener 20 shown on the map.

Figure 11:
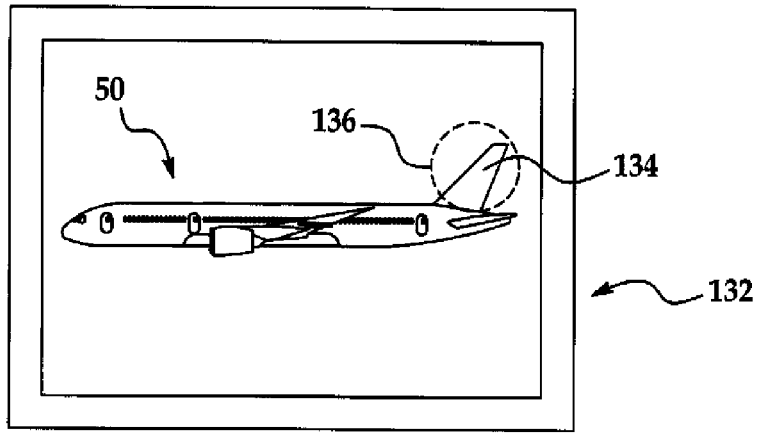
FIG. 11 is an illustration of a computer screen display showing an aircraft equipped with fasteners that allow wireless monitoring of fastener status.
Figure 12:
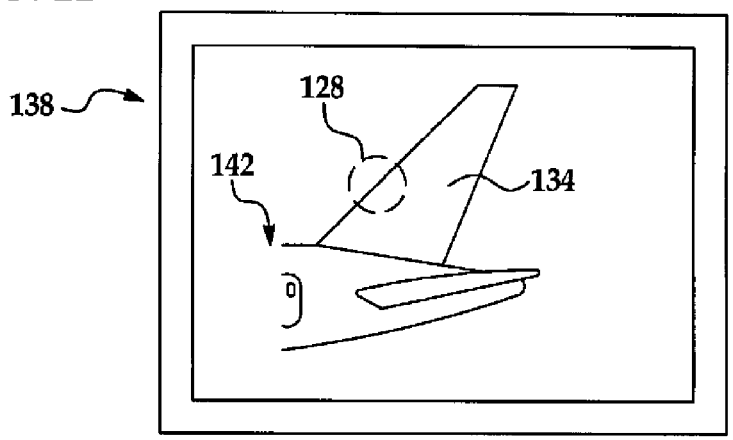
FIG. 12 is an illustration of a computer screen display showing a selected area of interest on a vertical stabilizer of the aircraft shown in FIG. 11.
Figure 13:
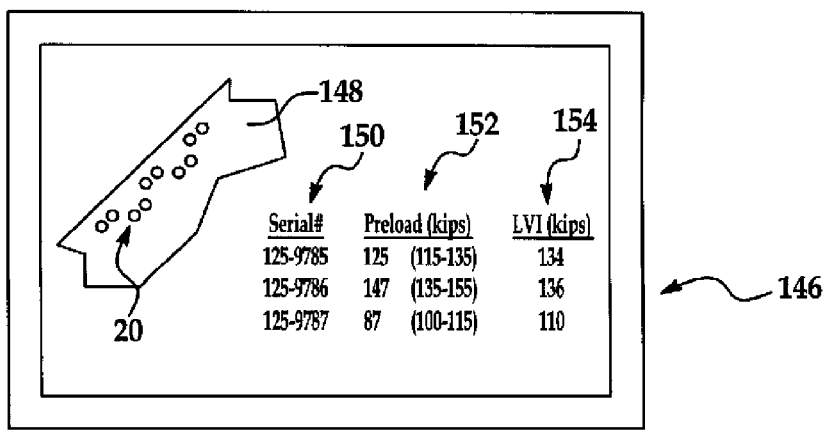
FIG. 13 is an illustration of a computer screen display showing a structural joint in the region of interest illustrated in FIG. 12, along with data representing fastener status.

Attention is now directed to FIGS. 11, 12 and 13 which illustrate how the measured fastener parameter values may be used in combination with various database files to monitor the health of a structure, such as the airplane 50 shown in an electronic display 132. Using a mouse or other pointer, a user may select an area 136 for examination which, in the illustrated example, comprises a vertical stabilizer 134. As shown in the screen display 138 in FIG. 12, the user may examine a particular area 144 of the vertical stabilizer 140 which, when selected, may result in a screen display 146 similar to that shown in FIG. 13. In screen display 146, the fasteners 20 within the selected area 144 (FIG. 12) are shown along with serial numbers 150 of the fasteners 20 as well as measured parameter values 152 and a set of parameter values 154 that may have been manually recorded by service personnel based on visual inspection of the fasteners 20. A range of acceptable parameter values representing acceptable tolerances is indicated within parenthesis, adjacent the measured preload values 152.

Figure 14:
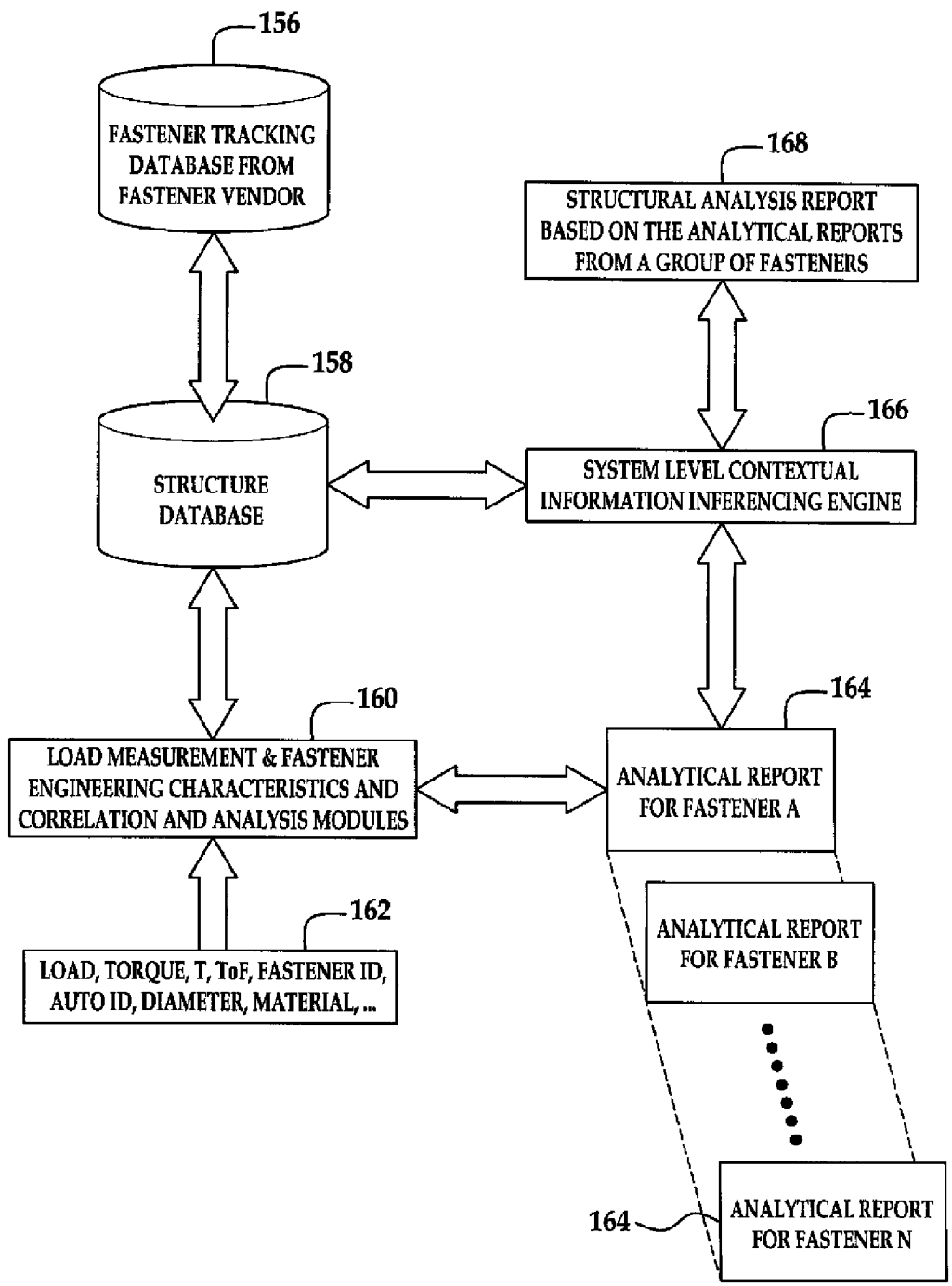
FIG. 14 is an illustration of a combined block and flow diagram of a system for analyzing a structure using measurement of fastener parameters.

Attention is now directed to FIG. 14 which illustrates a system for performing a structural analysis useful in a wide variety of applications, including but not limited to analyzing the health of aircraft structures that employ fasteners 20 similar to those previously described above. Although not shown in FIG. 14, the system may be implemented through use of a computer such as any of the computers (66, 60, 82a, 96) previously mentioned.

The computer may have access to a structure database 158 which may include various information including predefined characteristics relating to the fasteners 20 as well as the structure and environment in which the fasteners 20 are installed, and historical operational/performance data, such as the maximum stress/strain to which a fastener has been previously subjected. The data base 158 may also include additional information such as the identity of the specific tools that were used to install a fastener, and the identity of the manufacturer who manufactured the fastener. The system may include a fastener tracking database 156 which may be generated by the manufacturer of the fasteners. The fastener tracking database 156 may include such information as a serial or other identification number that is unique to each fastener 20, fastener diameter, grip length, the material from which the fastener 20 is made, the zero load acoustic signature of the fastener 20 and similar information which may be necessary and useful in installing and monitoring the fastener 20 as previously described. The structure database 158 may also include a wide range of data relating to the structure on which the fasteners 20 are installed, as well data relating to the fasteners 20, such as the specifications of the structure, the material from which the structure is made, the location on the structure at which fasteners are to be installed, the location at which fasteners are installed, the allowable maximum and minimum preloads for the fasteners 20, the magnitude of initial torque used to install each fastener 20, the ambient temperature surrounding the fasteners, the temperature of the fastener, the material from which the fasteners is made, etc.

Any of a variety of parameters may be measured along with the non-contact measurement of the preload of the fastener 20, as previously described. For example, in addition to measurement of the preload, torque applied to the fastener during installation as well as the temperature of the fastener 20 may be measured, stored and wirelessly transmitted from the fastener 20 to a monitoring station 82, 90 (FIGS. 8 and 9) where it is processed and used in performing a structural analysis using the disclosed computer implemented method.

Correlation and analysis modules 160, which comprise one of more software programs, are used to correlate measured fastener parameters with a variety of data which may include, but is not limited to engineering characteristics of the fasteners 20 as well as information relating to the particular structure and environment in which the fasteners 20 are installed. As shown at 162, in addition to the preload measurements, other measurements including torque and temperature, as well as other fastener data such as time-of-flight, a fastener ID number, diameter, material composition, etc. may be provided to the correlation and analysis modules 160 and used to perform computer implemented correlations in which the measured fastener parameters for one or more groups of fasteners 20 are correlated to information contained in the structure database 158.

The correlation performed by the correlation and analysis modules 160 results in the generation of an analytical report 164 for each of the fasteners 20. An analytical report 164 for a fastener 20 may reflect, for example, the correlation of a measured preload with the location of the fastener 20 on the structure, or the temperature of the environment where the fastener 20 is installed.

A system level, contextual information inferencing engine 166, which may be implemented by one or more software programs, functions to generate inferences based on the analytical fastener reports 164 and information in the structure database 158 which provides the context for the reports 164. For example, the inferencing engine 166 may infer the strength or integrity of a particular section of a structure based on the analytical fastener reports 164 for those fasteners 20 in that section of the structure as well as information about the section derived from the structure database 158. The inferencing engine 166 generates a structural analysis report at 168 which represents the inferences drawn from the analytical reports 164 in the context of the structural information derived from the structure database 158.

Figure 15:
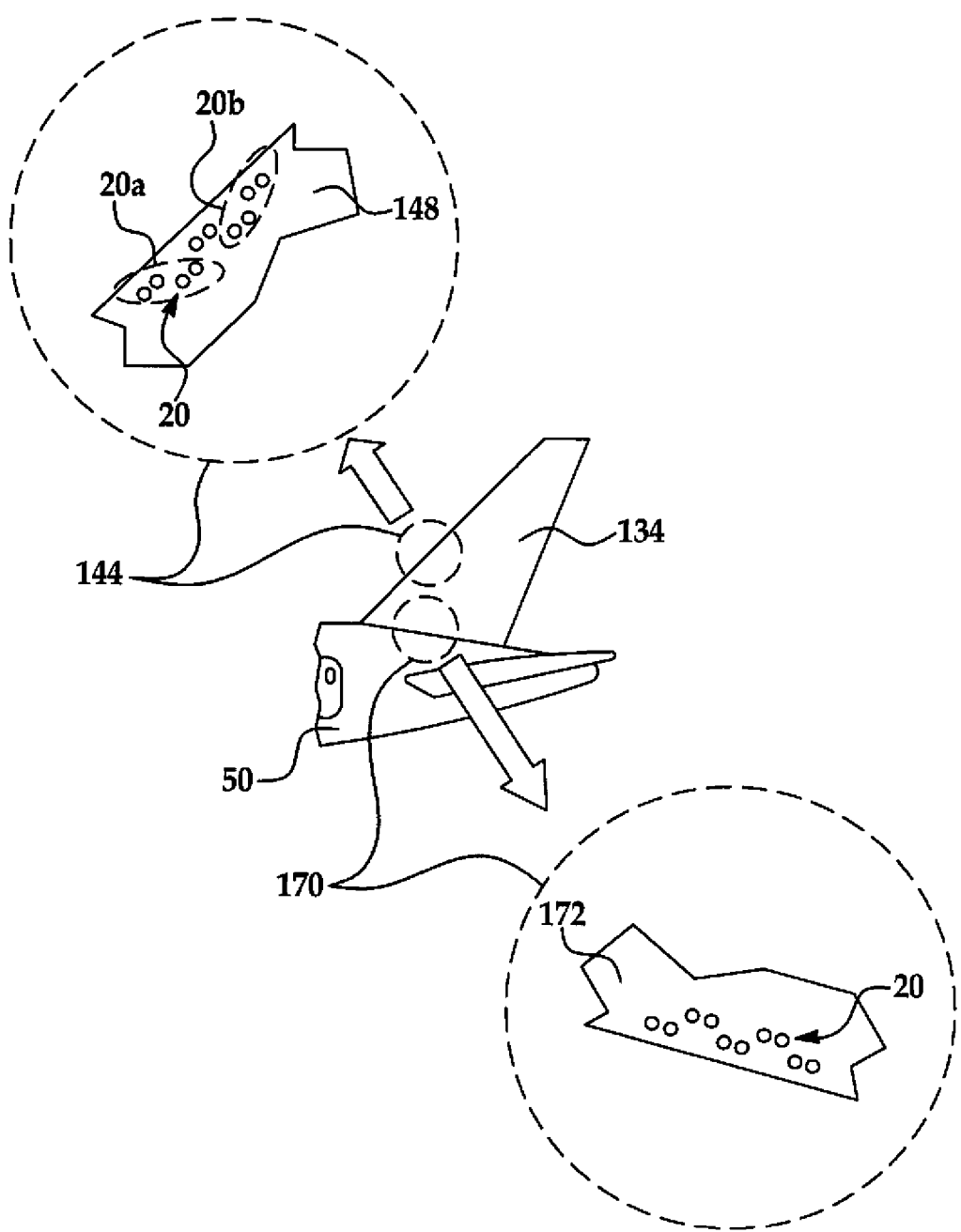
FIG. 15 is an illustration of an aircraft tail assembly showing two sections of a vertical stabilizer enlarged for clarity.

FIG. 15 illustrates an example of a structural analysis according to the disclosed embodiments that may be performed to assess the health of a vertical stabilizer 134 on an aircraft 50. In this example, fastener measurements derived from two differing sections 144, 170 of the stabilizer 134 may be correlated. Additionally, within the section 144, a particular area 148 may contain two separate groups of fasteners 20*a*, 20*b*. A correlation may be performed between the measurements obtained from the two fastener groups 20*a*, 20*b*, which may lead to an inference that an undesirable load gradient or trend in preload values exists in the area 148. For example, if all of the fasteners 20 within the group 20*b* have preloads that are below accepted levels, while the preloads of the fasteners within group 20*a* are within tolerance, then certain inferences may be made regarding the health of the structure. Similarly, a correlation analysis may be performed based on the measured preloads of the fasteners in section 144 to the measured preloads of the fasteners 20 in an area 172 of another section 170 of the stabilizer 134.

Figure 16:
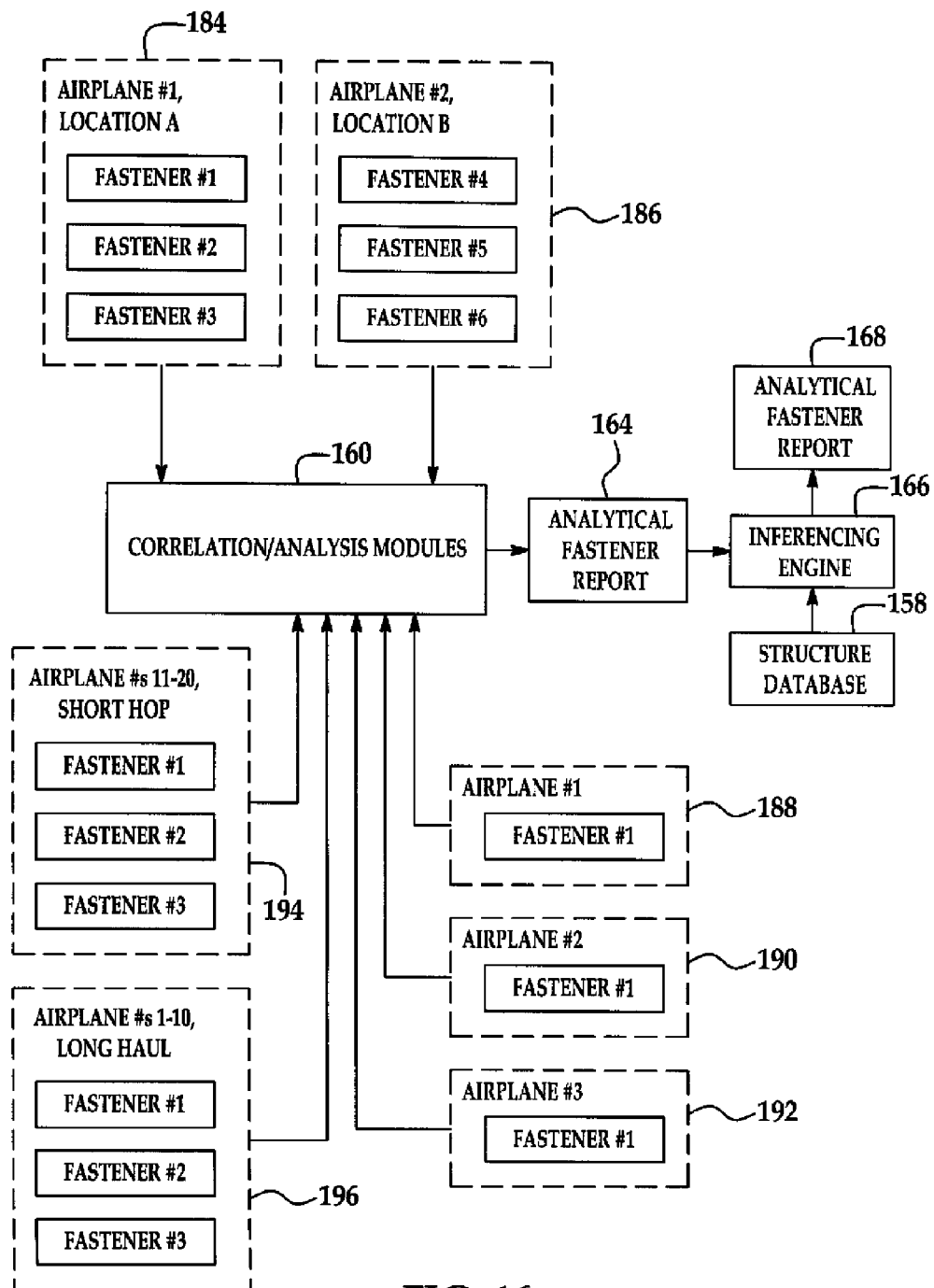
FIG. 16 is an illustration of a flow diagram showing a method of structural analysis for a fleet of airplanes.

FIG. 16 provides additional examples of the disclosed method of structural analysis using the system shown in FIG. 14 to assess the health of a structure in the context of aircraft applications. For example, the preloads of fasteners 20 installed on two identical airplanes may be correlated using the correlation and analysis module 160. Specifically, the preload may be measured of fastener #s 1-3 at location A on airplane #1, as shown at 184. These measured preloads may be correlated to a set of measured preloads for fastener #s 4-6 at location B on airplane #2, as shown at 186. The correlation and analysis results in the generation of analytical fastener reports at 164 which are used by the inferencing engine 166 to produce an analytical structure report 168 representing inferences drawn regarding the health of sections within locations A and/or B on airplanes #s 1 and 2. As a similar example, the measured preloads on two groups of fasteners 20 having the same location (location A or location B) on two different, but identical airplanes (e.g. airplanes 1 and 2) may be correlated and used to analyze the structural health of the airplanes 1 and 2.

In another example, as shown at 194 and 196 in FIG. 16, the measured fastener preloads on a group of airplanes #s 1-10 used for long haul flights may be compared to the measured preloads of identical fasteners at the same location on a second set of airplanes #s 11-20 which are limited to short hop flight schedules. Fasteners 20 on airplane #s 11-20 are subject to more frequent pressure cycling as a result of frequent cabin pressurization/depressurization schedules, as well as landing and takeoff induced structural loading/stresses typically experienced in short hop flight schedules. The correlation and analysis modules 160 may perform a correlation between the measured preloads of airplane #s 1-10 to airplane #s 11-20 in order to generate analytical reports 164 that may be used by the inferencing engine 166 to assess the health of one or more sections of the airplanes #s 1-20.

In still another example, the measured preload of each of a group of identical fasteners installed at the same location on different, but identical airplanes 188, 190, 192 may be correlated to each other in order to assess the structural health of a particular location on the airplanes.

Figure 17:
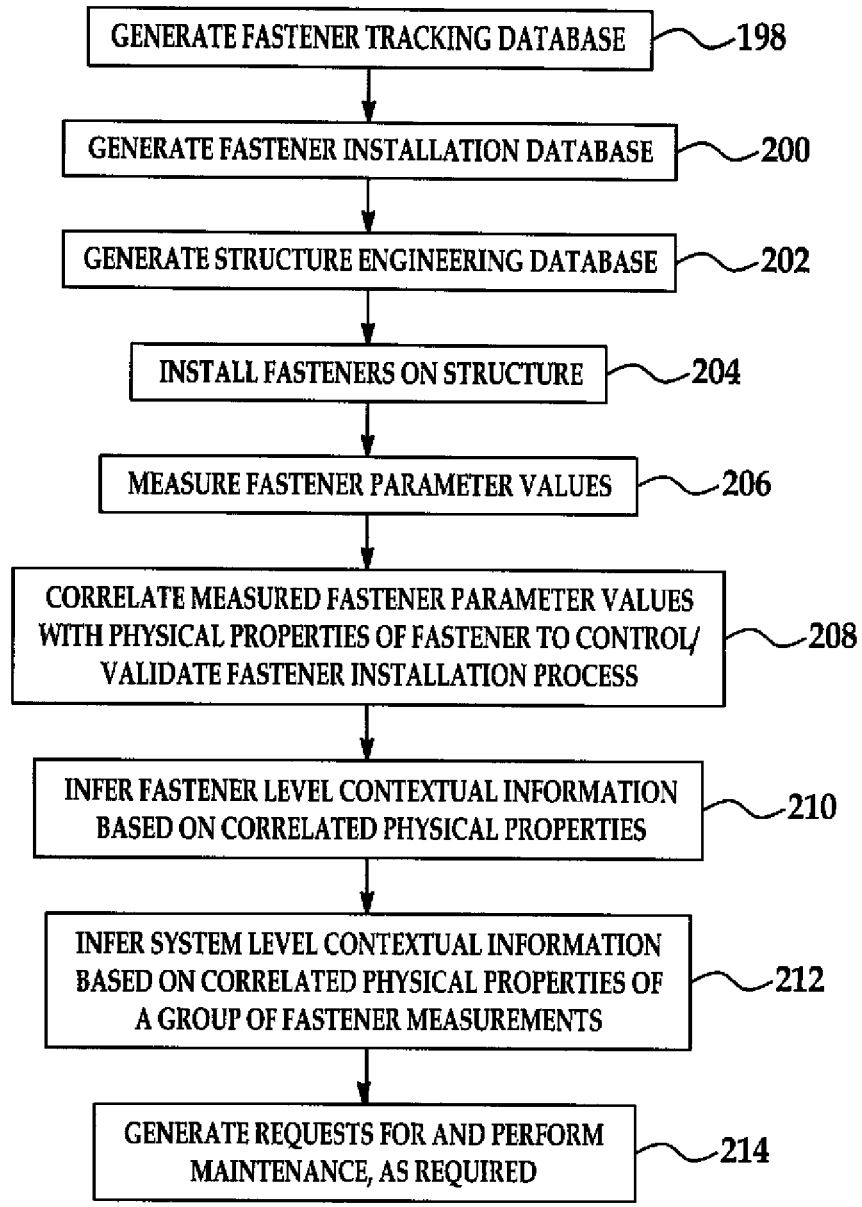
FIG. 17 is an illustration of a flow diagram showing the steps of a method of structural analysis.

FIG. 17 illustrates the overall steps of a method of performing a structural analysis using the correlation and inferencing techniques described above. Beginning at 198, the fastener manufacturing database 156 (FIG. 14) is generated, which may include a variety of information relating to each particular fastener 20, including, as previously described, fastener ID, zero load acoustic signature, diameter, grip length, material, etc. Next, at 200, a fastener installation database is generated which includes a description of the structure and location on the structure where each particular fastener is installed. The database generated at 200 may include a variety of other information, such as, without limitation, the depth of a fastener countersink, the material of the structure, the center-to-center distance between adjacent fasteners, etc.

At 202, the structure database 158 (FIG. 14) is generated which may include a variety of engineering performance and specification information, including the load ratings of each of the fasteners 20, the tolerance of preload for each fastener based on its installed location, etc.

At step 204, the fasteners 20 are installed on a structure, and additional information may be recorded that is stored in the engineering database at 202, including but not limited to, the amount of torque used to install each fastener 20.

Next, at 206, on a periodic basis, fastener parameter values are measured using the non-contact wireless techniques described previously. As discussed above, the measured fastener parameter values may include, but are not limited to preload of the fastener.

At step 208, the measured fastener parameter values are correlated with physical properties of the fasteners 20 in order to control and/or validate the fastener installation process. For example, after the initial installation of a fastener 20, the measured preload on the fastener 20 may be compared to the range of target preloads representing an acceptable tolerance.

At step 210, fastener level contextual information may be inferred based on the correlated physical properties of the fasteners 20. Using the fastener level contextual information forming part of the analytical fastener reports 164 (FIG. 14), system level contextual information can be inferred at 212 based on the correlated physical properties of a group of fastener measurements. Based on the inferred contextual information produced at 212, which provides information relating to the health of the structure, one or more requests for maintenance may be generated, and the requested maintenance may be carried out, as shown at step 214 in order to address any issues revealed by the structural analysis performed at 212.

Figure 18:
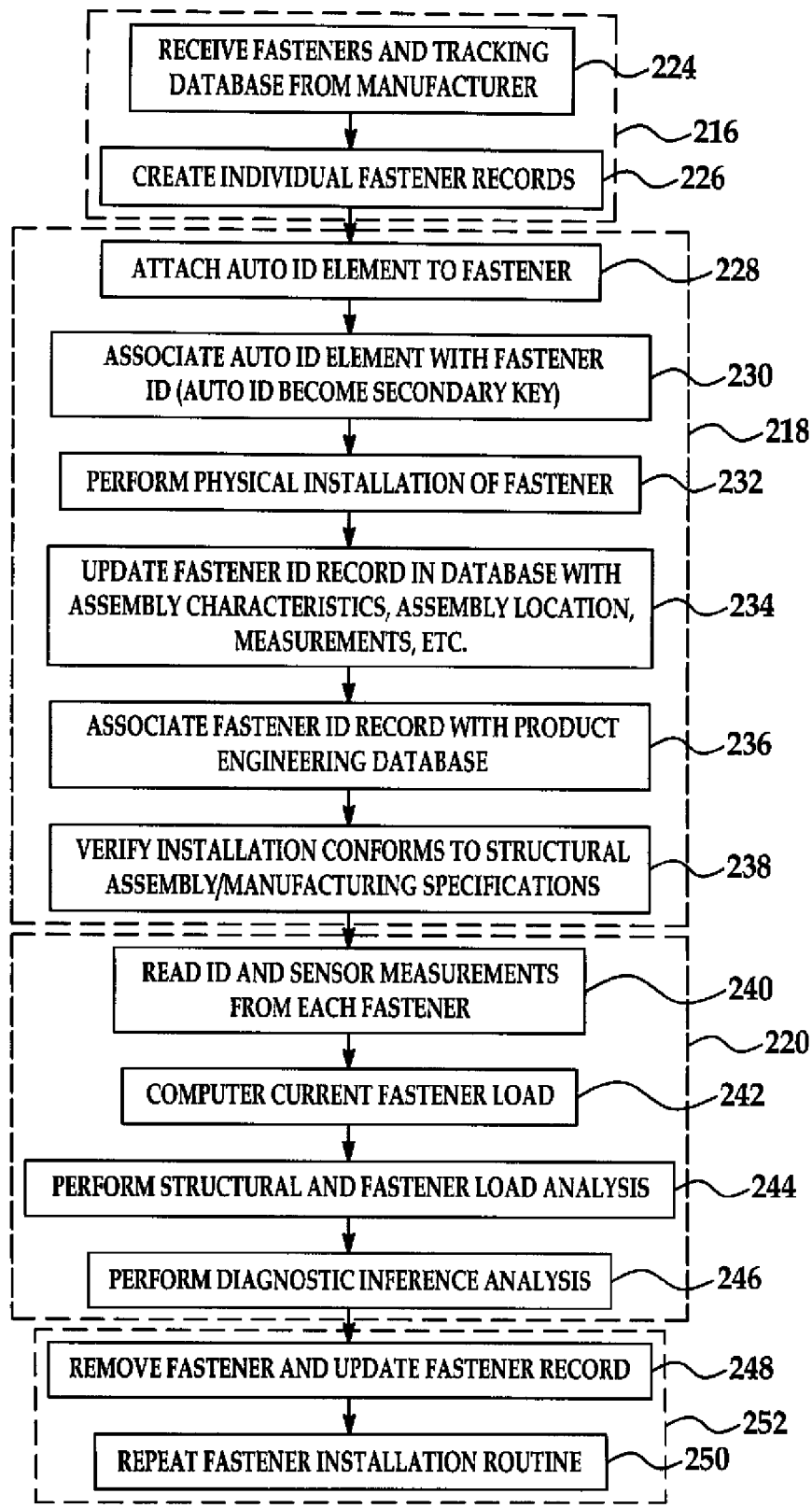
FIG. 18 is an illustration of a flow diagram of a method of monitoring the health of a structure using measurement of fastener parameters.

Attention is now directed to FIG. 18 which illustrates a method of monitoring the health of a structure such as an aircraft 50 that uses fasteners 20. Although the method will be described in the context of an aircraft 50, it is to be understood that the disclosed method embodiments may be employed to maintain and service a variety of other structures. Broadly, the fasteners 20 are received and processed by the user from a fastener manufacturer at 216. At 218, the user, which may be an airplane manufacturing OEM, installs the fasteners 20 on an airplane 50 and subsequently monitors the status of the fasteners 20 through a series of steps shown at 220. At 252, the airplane OEM, an airplane operator or an MRO may provide appropriate maintenance and/or service, as needed.

Returning to 216, the fasteners and related fastener tracking database are received from the fastener manufacturer at 224. Individual fastener records may then be created, in electronic form, at 226.

The installation process begins at 228 in which an identifier (ID) such as a serial number or other identifier element is attached to the fastener 20. The identifier may be a bar code, or may be in an electronic form embedded in a sensor or an auto ID tag that is attached to the fastener 20. The auto ID element may comprise an identifier that forms part of the aircraft OEM's database. At 230, the auto ID element is associated with the fastener ID and the auto ID becomes the secondary key. This allows the aircraft OEM's ID number to be traced back to the ID number assigned to the fastener 20 by the fastener manufacturer.

At step 232, physical installation of the fastener on the structure takes place, following which, at 234, the fastener ID record forming part of the structure database 158 (FIG. 14) is updated with assembly characteristics, the assembly location, installation measurements such as initial torque, etc. Next at 236, the fastener ID record is associated with a product engineering database which may be part of the structure database 158 previously described. The installation process is completed at 238 by verifying that the installation conforms to the structural assembly and manufacturing specifications which may also form part of the structure database 158.

Periodic monitoring of the status of the fasteners 20 begins at 240 in which the ID and sensor measurements are read from each of the fasteners 20 using the wireless non-contact techniques described above. Next, at 242, the current fastener load is computed based on preload measurements, environmental conditions and prior reference information retrieved from the existing fastener record forming part of the structure database 158 (FIG. 14). At step 244, a structural and fastener load analysis is performed based on current fastener load and measurements from fasteners 20 adjacent to a fastener 20 being measured, and a correlation analysis to determine the state of the structure. At step 246, a diagnostic inference analysis is performed and a structural analysis report is compiled for post measurement manual or computerized analysis.

Depending upon the results of the analysis performed at step 246, the fastener 20 may be removed and the fastener record updated at 248. In the event that a fastener is removed at 248, the fastener installation routine is repeated, as shown at 250.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of analyzing a structure, comprising:
   storing in a plurality of radio frequency identification (RFID) tags a value of at least one parameter indicating a status of each of a plurality of fasteners installed on a structure;
   measuring with a handheld reader the value of the at least one parameter stored in the plurality of RFID tags indicating the status of each of the plurality of fasteners installed on the structure;
   correlating the measured values;
   analyzing the structure based on the results of the correlation; and
   generating an analytical report for each of the fasteners based on the results of the correlation, wherein at least one of the correlating and analyzing is performed using a programmed computer.

2. The method of claim 1, wherein the correlating includes:
   correlating the measured values to predefined characteristics of the environment in which the fastener is installed and historical operational data for the structure.

3. The method of claim 2, wherein the predefined characteristics and historical operational data include at least one of:
   installed fastener location,
   allowable maximum load on the fastener,
   magnitude of torque used to install the fastener,
   ambient temperature range,
   the maximum stress and strain to which the fastener has been previously subjected,
   the material from which the fastener is constructed, and
   the material from which the structure is constructed.

4. The method of claim 1, wherein the parameter is one of:
   preload on the fastener,
   torque,
   ambient temperature surrounding the fastener,
   stress or strain, and
   an identifier that uniquely identifies the fastener.

5. The method of claim 1, wherein analyzing the structure includes using a computer to infer information representing the health of the structure based on the results of the correlations.

6. The method of claim 5, further comprising:
   generating an analytical report for each of the fasteners based on the results of the correlation, and
   wherein using the computer to infer the health of the structure is based on the analytical reports.

7. A computer implemented method of analyzing the health of a structure, comprising:
   measuring the value of preload on each of a plurality of fasteners installed on the structure;
   correlating the measured values of preload with a set of database information relating to the structure;
   generating a report for each of the fasteners representing the results of the correlations;
   inferring the health of the structure based on a group of the fastener reports;
   applying a voltage pulse to each of the plurality of fasteners; and measuring a time of flight of an ultrasonic wave reflected back from an end of each of the plurality of fasteners.

8. The method of claim 7, wherein the measured values of preload are correlated to at least one of:
the location of the fasteners on the structure,
the tools that were used to install the fastener,
the identity of the manufacturer who manufactured the fasteners,
the temperature of the fasteners,
the magnitude of initial torques used to install the fasteners,
preload tolerances representing allowable maximum and minimums allowable values of preload,
the material from which the structure is made, and
the material from which the fasteners are made.

9. The method of claim 1 further comprising displaying a structural map, the structural map showing a location of each of the plurality of fasteners on the structure.

10. The method of claim 7, further comprising:
wirelessly reading the measured preload values from each of the fasteners.

11. The method of claim 7, wherein inferring the health of the structure is performed by analyzing the correlated values of measured preload for at least two groups of the fasteners.

12. The method of claim 7, further comprising:
measuring the value of at least one parameter related to each of the fasteners other than preload; and
correlating the measured values of the at least one parameter with a set of database information relating to the structure.

13. The method of claim 7, wherein correlating the measured values, generating a report for each of the fasteners and inferring the health of the structure are performed at a ground based station off-board an aircraft.

14. The method of claim 7 further comprising:
measuring the value of preload on each of a second plurality of fasteners installed on a second structure, wherein structure is a first airplane and the second structure is a second airplane identical to the first airplane;
correlating the measured values of preload of the plurality of fasteners with the measured values of preload of the second plurality of fasteners.

15. The method of claim 7 further comprising:
measuring the value of preload on each of a second plurality of fasteners, the second plurality of fasteners being a second group of fasteners installed on a first portion of the structure, wherein the plurality of fasteners are a first group of fasteners separate from the second group of fasteners, the first group of fasteners also being installed on the first portion of the structure;
correlating the measured value of preload of the first group of fasteners with the measured value of preload of the second group of fasteners.

16. A system for analyzing an aircraft structure having a plurality of fasteners installed thereon, comprising:
a first plurality of sensors respectively on a first plurality of fasteners on a first section of the aircraft structure and each operable for measuring the value of at least one parameter related to the associated fastener;
a second plurality of sensors respectively on a second plurality of fasteners on a second section of the aircraft structure and each operable for measuring the value of at least one parameter related to the associated fastener;
a database containing information related to characteristics of the structure;
at least one correlation and analysis module for correlating the measured values from the first plurality of sensors and from the second plurality of sensors, for correlating the measured values of the parameter with at least one of the characteristics contained in the database, and for generating a report reflecting the results of the correlation;
an information inferencing engine for inferring structural information based on the report and for generating a structural analysis report reflecting the inferred structural information; and
a fastener tracking database used by the correlation and analysis module to correlate the measured values, the fastener tracking database including a set of data representing unique characteristics of each of the fasteners.

17. The system of claim 16, where the correlation and analysis module includes a software program.

18. The system of claim 16, wherein the inferencing engine includes a software program.

19. The system of claim 16, further comprising:
a programmed computer coupled with the database for controlling the operation of the correlation and analysis module and the inferencing engine.

20. The system of claim 16, further comprising:
a radio frequency transmitter on each of the fasteners for storing and transmitting the measured values, and
at least one reader on-board the aircraft for interrogating the transmitters and for receiving the measured values from the transmitters.

* * * * *